May 30, 1967 W. SWAROFSKY 3,322,050
PHOTOGRAPHIC CAMERA WITH ELECTRIC EXPOSURE METER
Filed Oct. 10, 1963
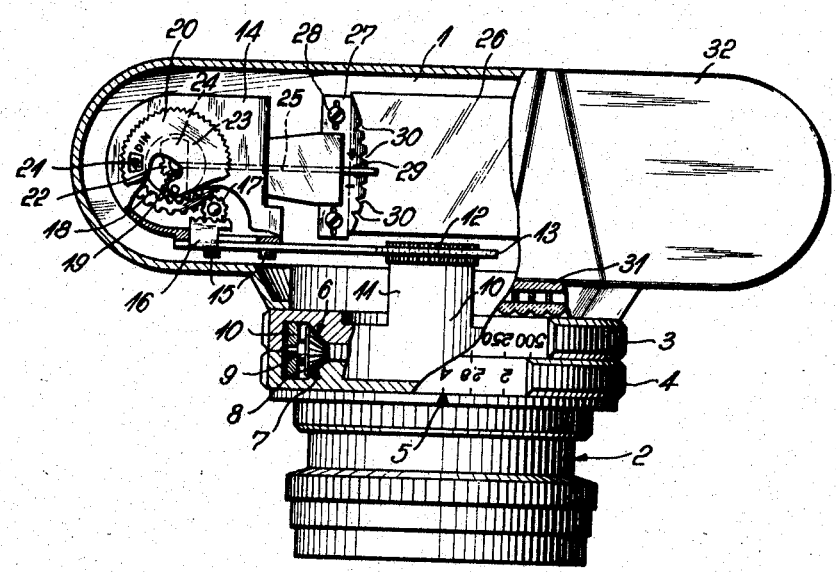

ent Office
Patented May 30, 1967

3,322,050
PHOTOGRAPHIC CAMERA WITH ELECTRIC
EXPOSURE METER
Walter Swarofsky, Braunschweig, Germany, assignor to Voigtlander A.G., Braunschweig, Germany, a corporation of Germany
Filed Oct. 10, 1963, Ser. No. 315,264
Claims priority, application Germany, Mar. 4, 1963, V 14,896
3 Claims. (Cl. 95—10)

This invention relates to photographic cameras having electric exposure meters and means for coupling the exposure meter with exposure factor adjusting or setting means so that, if the pointer of the meter coincides with a fixed indicator mark, a setting of the camera, corresponding to prevailing light and resulting in normal exposure of the light-sensitive material, is obtained. More particularly, the present invention is directed to novel and simplified means for inserting a correction factor into a camera of this type.

In a camera of the type to which the invention is particularly adaptable, the pointer or indicator of the meter is deflected in linear increments corresponding to a scale, divided by a factor "2," of the intensities of light striking the photosensitive cell of the meter.

There is a known photographic camera in which exposure factor adjusting means are also coupled with the exposure meter in the described manner, but in which the indicator of the meter is not deflected in linear increments. In this latter camera, adjustable indicator marks for making corrections are provided on both sides of the fixed indicator mark. If the pointer of the meter coincides with one of these correction marks, the setting of the camera has been changed by amounts equal to the correction. Such correction may take into account filter factors or special lighting conditions, such as photographs taken in bad weather or photographs taken against the light.

A disadvantage of this latter camera is that the position of the correction marks must be made adjustable, because the exposure factor adjusting means of the camera have linear scales. Thus, with various initial or incorrected settings of the exposure factor adjusting means, an introduced correction which may, for example, be equal to a full point, may correspond to different nonlinear deflections of the meter. To compensate for these differences with different initial or uncorrected exposure settings, the correction marks are made adjustable by relatively expensive and complicated mechanical adjusting means, and in such a manner that their distance from the fixed mark corresponds to the nonlinear deflection of the pointer of the indicating meter at any particular uncorrected initial exposure factor setting. If it is desired to provide several correction marks on both sides of the fixed mark, which would make it possible to apply corrections in the amount of 1, 2 or 3 points, a separate adjusting mechanism is required for each correction mark.

An object of the present invention is to provide means for setting the correction factor in a camera, having an exposure meter coupled with the exposure factor adjusting means in the manner described above, but which does not require expensive and complicated mechanism for adjusting the correction marks.

In accordance with the invention, the camera is of the type having an exposure meter with a linear scale. At least one adjusting mark, in a fixed position relative to the camera, is provided on each side of the fixed mark within the range of the meter pointer. These indicator marks are spaced at a distance from the fixed mark which determines changes in the setting of the camera. The distance between the fixed mark and the correction marks, and also the distance between the individual correction marks forming a series of correction marks, if such a series is used, corresponds to the distance which the meter pointer moves if the light, or the setting of the camera, is changed by one point. The distance between the fixed indicator mark and the correction marks can also be made equal to a part or to a multiple of the preferred one point distance.

The invention camera is substantially simpler than previously known cameras, and a setting corresponding to the desired correction factor is therefore obtained if the pointer is brought into coincidence with one of the fixed correction marks.

For an understanding of the principles of the invention, reference is made to the following desciption of a typical embodiment thereof as illustrated in the drawing. In the drawing, the single figure is a top plan view of a reflex camera with a portion of the housing cut away.

While the invention will be described as applied to a reflex camera such as shown in the drawing, it should be understood that this is exemplary only. Also, the indicator means and the pointer are illustrated as extending into the path of light rays passing through the viewfinder window of the camera. However, it should be understood that the indicator means and the scale or the like associated therewith may also be made directly visible through a separate window or opening in the camera.

Referring to the drawing, a camera casing 1 is illustrated as mounting a subassembly 2 comprising a shutter and an objective mount. An exposure time adjusting ring 3 and a diaphragm adjusting ring 4 are mounted on subassembly 2. The scale for the shutter time and the scale for the diaphragm setting, as provided on the respective adjusting rings, can be set and read against a common fixed mark 5.

Rings 3 and 4 carry gear sections 6 and 7, respectively, on their inner surfaces. A pinion 8 meshes with both gearing sections and is rotatable on a shaft 9 mounted on an adjusting ring 10 rotatably positioned within rings 3 and 4. A shaft or lug 11 on ring 10 extends into camera casing 1 and supports a ring gear 12. Rings 3, 4 and 10 constitute, due to the coupling action of pinion 8, a known type of differential drive.

A rack 13 has teeth meshing with the teeth of ring gear 12, and is slidably supported so that it can move longitudinally in the housing 14 of an electric exposure meter attached to camera casing 1. In order to support rack 13 for such sliding movement, housing 14 is provided with two guide pins 15 engaging a slot in rack 13. An angular finger 16 on rack 13 has teeth at one edge, and extends into housing 14. Within housing 14, the teeth of finger 16 engage a rotatable pinion 17 which, in turn, meshes with the external teeth of a ring gear 18. Another pinion 19 engages the internal teeth of ring gear 18, and pinion 19 is attached to that surface of a film sensitivity adjusting ring 20 which faces pinion 19.

Adjusting ring 20 is so mounted in housing 14 that it is difficult to turn. It projects sufficiently far beyond housing 14 that it may even protrude from the hood 32 of the camera, which likewise extends beyond casing 1. Due to this, ring 20 is accessible from the exterior of the camera. Ring 20 is formed with a window 21 through which an indication of the film sensitivity can be read on a suitable scale attached to a supporting means fixed relative to a ring 20. For example, the scale may be fixed to the cover of meter housing 14.

Pinion 19 meshes with a pinion 22 to which is rigidly attached a plate 23 carrying the movement 24 of an electric exposure meter having an indicating pointer 25. The tip of pointer 25 extends into the viewing area of the ground viewfinder plate 26 onto which the viewfinder image is projected by the objective of the reflex camera in a known manner. For example, the image may be provided by means of a prism located between the eyepiece and the ground plate 26 of the viewfinder.

An indicator plate 27 is associated operatively with pointer 25. Plate 27 is adjustably attached to casing 1 of the camera by means, for example, of being formed with elongated holes, and screws 28 passing through these holes and secured to casing 1. Plate 27 is provided with a circular punched hole 29 as a fixed mark, and on both sides of hole 29 notches 30 are formed in the edge of plate 27 and serve as further marks for setting the camera.

The electric exposure meter is built into the camera in a manner known per se, and is of the type such that its indicator 25 moves in increments which are linearly related to the changes in the intensity of the light striking a light sensitive cell 31. For this reason, the series of extra marks or correction marks constituted by the notches 30 are spaced from the punched hole 29 at equal spacings or intervals from each other.

The described mechanism functions in the following manner. If adjusting ring 20 is turned to a setting corresponding to the sensitivity of the film used, pinion 19 rotates with respect to and rolls along stationary ring gear 18 and simultaneously turns pinion 22. Pinion 22 has plate 23 attached thereto and carrying meter movement 24. This angularly adjusts meter movement 24, with relation to adjusting rings 3 and 4. If one of the adjusting rings 3 or 4 is turned, or if both are turned simultaneously in the same direction, the differential gearing described above effects the rotation of adjusting ring 10. This causes a corresponding angular adjustment of plate 23, carrying meter movement 24, through the medium of ring gear 12, rack 13, extension 16 with its teeth, pinion 17, ring gear 18 and pinion 19, which now remains in fixed position and merely rotates, in addition to pinion 22. The described parts are located and adjusted in such a manner in relation to each other that, if pointer 25 of the meter coincides with hole 29 as shown in the drawing, the setting of exposure time and of diaphragm aperture corresponds to the intensity of the light striking light sensitive cell 31.

Notches 30 in plate 27 are provided so that settings different from the standard settings can be attained for the purpose of intentional overexposure or intentional underexposure, or if the illumination in the scene to be photographed is usual, such as in shots against the light, twilight shots, shots under heavy clouds, and particularly bright subjects. If pointer 25 is made to coincide with one of the notches 30 by turning ring 3, or ring 4, or both rings, the time setting and the diaphragm aperture setting will differ by one, two or three points from the standard setting depending upon whether pointer 25 is positioned in alignment with the first, second or third notch 30 as counted from hole 29. The corrective change will be toward overexposure if a notch 30 in the area of the "plus" symbol is used, and will be toward underexposure if a notch 30 is in the area of the "minus" symbol is used.

Notches 30 can also be provided at distances from punch mark 29 other than distances corresponding to a full point adjustment. They may further be used to obtain settings which take the filter factors into account.

Indicator plate 27 preferably consists of a transparent material which may have a single color or may have several colors. For example, plate 27 may be green in the area of hole 29 and red in the areas of notches 30.

While a specific embodiment of the invention has been shown and described in detail to illustrate the application of the principles of the invention, it will be understood that the invention may be embodied otherwise without departing from such principles.

What is claimed is:

1. In a photographic camera, the combination comprising a photoelectric exposure meter including a measuring instrument, having an indicator, and a light-sensitive cell; said indicator being movable in linear increments corresponding to a scale, divided by the factor "2" of the intensities of light incident upon said cell; a fixed reference mark cooperable with said indicator; exposure time adjusting means; diaphragm aperture adjusting means; film sensitivity adjusting means; mechanism interconnecting all three of said adjusting means and said measuring instrument and effective, through said three adjusting means, to provide a normal exposure of the film when said indicator coincides with said reference mark; and at least a pair of fixed correction marks respectively situated on opposite sides of said reference mark and cooperable with said indicator for respectively providing an overexposure or an underexposure, as compared to an exposure when said indicator coincides with said reference mark, when said indicator is aligned with one or the other of said correction marks, respectively; the spacings of said correction marks from said reference mark corresponding to fixed increments of said scale, and indicia respectively situated adjacent said correction marks and indicating which of said marks will provide said overexposure and which of said marks will provide said underexposure; said fixed reference marks and said correction marks being carried by a common indicator mark plate; said fixed reference mark being in the form of an aperture through the indicator mark plate, and said correction marks comprising notches cut in an edge of the indicator mark plate.

2. In a photographic camera, the combination claimed in claim 1 in which said edge of said indicator plate having said notches cut therein is a circular arc concentric with the axis of rotation of said indicator.

3. In a photographic camera, the combination claimed in claim 2, in which there are plural equi-spaced notches on both sides of said fixed reference mark.

References Cited
UNITED STATES PATENTS

| | | | |
|---|---|---|---|
| 1,305,077 | 8/1962 | Agfa | 95—10 |
| 3,127,822 | 4/1964 | Kiper | 95—10 |
| 3,145,633 | 8/1964 | Rentschler | 95—10 |
| 3,220,329 | 11/1965 | Coleman | 95—64 |

JOHN M. HORAN, *Primary Examiner.*